July 19, 1949.

R. STOJANEK 2,476,927

ELECTRICAL WATER HEATER

Filed Dec. 30, 1946

Witnesses:

Inventor:
Rudolf Stojanek

Patented July 19, 1949

2,476,927

UNITED STATES PATENT OFFICE 2,476,927

ELECTRICAL WATER HEATER

Rudolf Stojánek, Prague, Czechoslovakia

Application December 30, 1946, Serial No. 719,285
In Czechoslovakia August 9, 1946

1 Claim. (Cl. 219—39)

Various electrical water-heaters are already known which are connected to a water pipe, wherein by means of electrical resistance heating a container is heated through which the water to be heated flows. Since in the arrangements of this kind hitherto existing the heating resistance is used for the heating of a further body, by means of which the water is heated, it is thus necessary to provide a comparatively large heating member in order that the water flowing through may be heated rapidly and effectively. The known arrangements of this kind are therefore comparatively large, and before adopting them it is necessary to take into consideration the high first costs and running charges.

The present invention relates to an electrical water-heater whereby the disadvantages referred to of the known arrangements are obviated, owing to the fact that the resistance wires of the heating element are located directly in the stream of the flowing water, in the cavity of a known water pipe valve behind the valve cone, in such a manner that the water flowing through the valve comes into direct contact with the glowing resistance wires and is thereby quickly heated.

One constructional form of the invention is shown diagrammatically in the accompanying drawings, in which.

Figure 1:
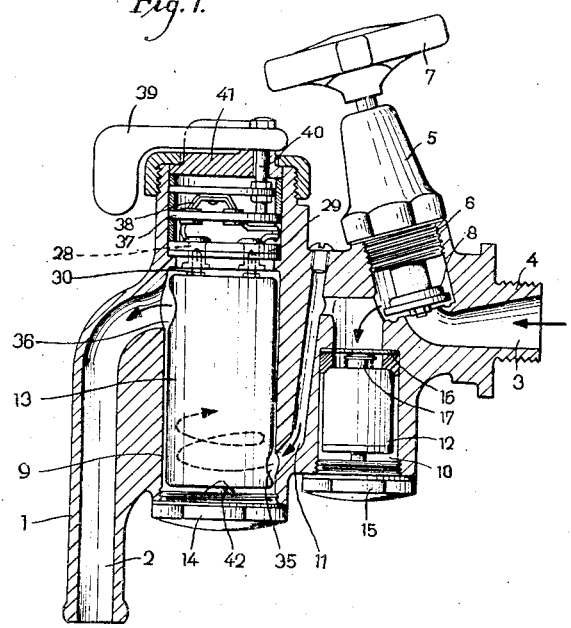
Figure 1 shows a longitudinal section through a water pipe valve with heating element and switch in accordance with the invention.

The water-heater according to the invention has essentially the form of an ordinary water-pipe valve, with an outlet 1, the channel 2 of which is connected to the inlet or supply 3 through the inner cavities of the valve, the said inlet being connected to the water pipe by means of a screw thread 4. The supply of water is regulated by means of an ordinary valve 5, which is screwed into the valve body by means of a screw thread 6, its valve plate 8 being actuated by a hand wheel 7.

In accordance with the invention, the valve body is provided, between the outlet 2 and the inlet 3, with two cavities 9 and 10, which are connected through a reducing channel 11. The cavity 10 located behind the valve cone 5 serves to accommodate a switch 12, by means of which, when the water is flowing through, the electric current is automatically switched in, whilst the heating element 13 for the heating of the water is arranged in the cavity 9. These two cavities are located close to one another, with open ends, on the under side of the valve body, closed by means of closing plugs 14 and 15 respectively.

The switch 12 located in the cavity 10 behind the valve cone 5 is actuated by the pressure of the water streaming from the supply channel 3. For this purpose a membrane or diaphragm 16, located in the cavity 10, acts on a pin 17 of the switch in such a manner that through the movement produced on the membrane by the water pressure the switch contacts meet, thereby closing the circuit to the heating element 13.

Figure 3:
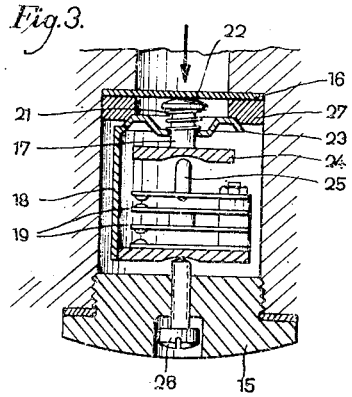
Figure 3 is a longitudinal section through the switch.

The switch is shown in Figure 3 on a larger scale. The water pressure acts on the diaphragm or membrane 16 in the direction of the arrow. The switch, consisting of a sleeve 18 carrying contacts 19, is fitted into the cavity of the valve body. The current circuit is closed by means of a pin 17 which presses against the diaphragm 16 by means of a button 22, and is under the action of a spring 21, which bears on the one hand on the button 22 and on the other hand on the support plate 23 of the switch. The pin acts further by means of a plate 24 on a bolt 25, which is connected to the contact plate 19. The switch is held firmly in the cavity of the valve by means of a bearing screw 26 in the closing plug 15. Between the sleeve 18 and the diaphragm 16 there is an ordinary packing ring 27.

Through channels in the valve body, which are not shown in the drawing, are led the conductor wires by means of which the switch 12 is connected to contacts 28 on the plug box cover 29, which is arranged in the cavity 9 of the heating element 13. The heating element 13 is provided with plug pins 30, which are inserted into the plug contacts 28.

Figure 2:
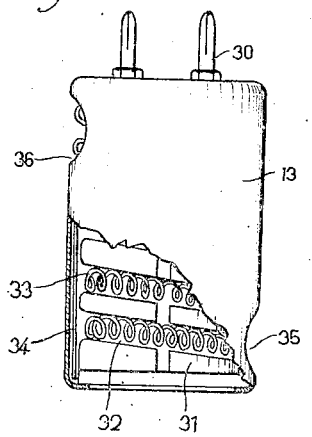
Figure 2 is a view in evelation through the heating element with the casing partly broken away.

The heating element 13 is shown in Figure 2 on a larger scale, and consists of an ordinary insulating element 31, in a helical slot 32 in which a resistance wire 33, connected to the plug pins 30, is situated. The insulating element 31 is surrounded by a closely fitting casing 34, which is provided above and below with openings 35 and 36. These opposite holes 35 and 36 are arranged at such heights that in the case of a heating element arranged in the cavity 9, the opening 35 is opposite the channel 11 and the opening 36 opposite the chanel 2 of the outlet 1. The water flowing through the water-pipe valve is compelled to traverse the heating element 13, that is, to flow inside the casing 34 along the glowing resistance wires 33, in the direction shown by the spiral arrow, to the outlet opening 2, the water being heated by direct contact with the resistance wire, so that without the provision of a special heating container, warm or hot water flows from the water-pipe valve according to the regulation of the speed of outflow through the valve 5.

Since the electric current to the heating element 13 is closed automatically only when the valve 5 is open and through the water pressure on the diaphragm 16, any accidental switching in of the current without a flow of water, thus damaging the heating element, is impossible.

In order to enable the heating current to be switched off even when water is passing through, should cold water be required for instance, the current is switched off by means of a special change-over switch 37 connected to the contacts 28 and arranged above the plug box cover 29 of the heating element 13. The contact lever 38 fixed to the bolt 40 is actuated by means of a hand lever 39 so arranged that it can swivel on the cover 41. The cover 41 is provided with stops for limiting the swivelling movement of the hand lever 39, and also with indicating marks for the current switched on and off. The heating element 13 is maintained in the required position below the cavity 9 by means of the plug 14, which is preferably provided with a centering cone 42 which fits into the heating element 13 and presses it against the plug box cover 29 as shown in Figure 1. The heating element and the switch are thus formed as closed and easily removable units, which can be changed as required.

The form of the switch and the change-over switch is not of course limited to the construction shown, and other constructional forms made up of known components may be used with the same effect within the scope of the invention, such components coming under the invention only in their connection with the heating element arranged in a water-pipe valve.

I claim:

In an electric water heater suitable for attachment as a faucet to a water supply pipe, the combination of a body having a conduit therethrough with intake and discharge ports, and a pair of recesses formed in said conduit; a valve in said conduit between said intake port and said recesses; and electric switch removably mounted in the first of said recesses; an electric heating unit removably mounted in the second of said recesses, said unit having resistance electric wires so disposed in said conduit as to contact water passing through said conduit; electric connections to said switch from a source of electricity; electric connections from said switch to said heating unit; and a flexible diaphragm so mounted in said first recess that it is flexed by hydraulic pressure of the water flowing through said conduit and close said switch when so flexed.

RUDOLF STOJÁNEK.

REFERENCES CITED

The following references are of record in the file of this patent:

UNITED STATES PATENTS

| Number | Name | Date |
| --- | --- | --- |
| 1,456,878 | Kohn | May 29, 1923 |
| 1,554,502 | Hulse | Sept. 22, 1925 |
| 1,645,278 | Cid | Oct. 11, 1927 |
| 1,854,880 | Berthold | Apr. 19, 1932 |
| 1,980,199 | Grundler | Nov. 13, 1934 |